May 18, 1965   J. A. RODAER   3,184,676
STATIC INVERTER
Filed March 15, 1961   2 Sheets-Sheet 1

INVENTOR
James A. Rodaer
BY
Robert E. Fowler
ATTORNEY

May 18, 1965  J. A. RODAER  3,184,676
STATIC INVERTER
Filed March 15, 1961  2 Sheets-Sheet 2

INVENTORS
James A. Rodaer
BY
Robert E. Fowler
ATTORNEY

United States Patent Office 3,184,676
Patented May 18, 1965

3,184,676
STATIC INVERTER
James A. Rodaer, Kokomo, Ind., assignor to General Motors Corporation, Detroit, Mich., a corporation of Delaware
Filed Mar. 15, 1961, Ser. No. 96,019
5 Claims. (Cl. 323—66)

This invention relates to an improved feedback or stabilizing control system for component voltages developed in the multi-phase circuits. In multi-phase circuits wherein the connections are of the delta type and in which magnetic amplifiers are used any tendency to cause phase shift by stabilizing feedback for regulating purposes creates circulating currents which are undesirable.

In a multi-phase power supply system such, for example, as a static inverter, regulating or stabilizing means are required for each phase to maintain the whole system in balance or stabilizing. If the output of the inverter is delta connected and the voltage in any one phase becomes unequal to that of either of the other two, circulating currents are developed in the output and the voltage has to be regulated and if care is not taken in such regulation further circulating currents develop from phase shifts created. Therefore, in applying controlling stabilizing feedback signals to magnetic amplifier sections of regulating devices means must be provided to vary only the voltage amplitude or control pulse width due to changes in output and not change the phase relation.

It is, therefore, an object in making this invention to provide control means in a power circuit such that if the amplitude of the output varies will develop and apply a corrective signal of opposite sign to stabilize the circuit without changing the phase thereof.

It is a further object in making this invention to provide a stabilizing feedback control circuit for an alternating current circuit which produces a variation in amplitude only and not phase.

With these and other objects in view which will become apparent as the specification proceeds, my invention will be best understood by reference to the following specification and claims and the illustrations in the accompanying drawings, in which:

One way in which to obtain output regulation in an alternating current circuit without an accompanying phase shift is to so design the associated circuitry as to obtain an output wave or pulse which varies in pulse or cyclic width and not in phase. The application of a D.C. control voltage fedback from the main output circuit, the value of which is proportional to the R.M.S. value of the output voltage in such a circuit will vary the pulse width to vary the value of the output wave without changing its phase. As stated before the problem of phase shift in regulation only occurs where there are a multiplicity of associated phases and this results in the introduction of unwanted circulating currents so it will be assumed that there are at least two phases involved.

Figure 1:
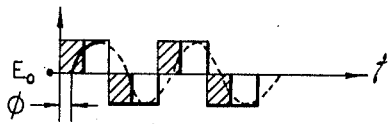
FIGURES 1 and 1A are voltage-time graphs illustrating the cyclic load voltages and wave form for amplitude change in various circuits.

FIG. 1 illustrates the output of a single phase power circuit which may form a part of a multi-phase system which may include as part of the control circuit a magnetic amplifier. In this figure each half cycle is shown in square form having two parts, one shown diagonally cross-hatched and the other plain. This illustrates that with a conventional magnetic amplifier control circuit in the first part of each half cycle the total voltage drop of the circuit is across the magnetic amplifier and none appears across the load and since the last section is plain, illustrates that for the rest of the half cycle the whole voltage drop is across the load and substantially none across the magnetic amplifier. The sine wave drawn through the center illustrates the voltage variation when there is a phase shift of $\phi°$ due to control signals and what this would do to unbalance the multi-phase system.

Figure 1A:
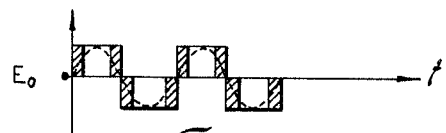

FIG. 1A is a similar diagram in which the half cycles are again shown as squares but then shaded on opposite sides to illustrate how the waves can be controlled by preloading the core saturation and thus changing the pulse width to vary the R.M.S. value without changing the phase. In this type of control the voltage drop across the load is still shown plain and due to design occurs during the middle of each cycle, the drop across the magnetic amplifier being that shaded area on each side at the beginning and end of the cycle.

Figure 2:
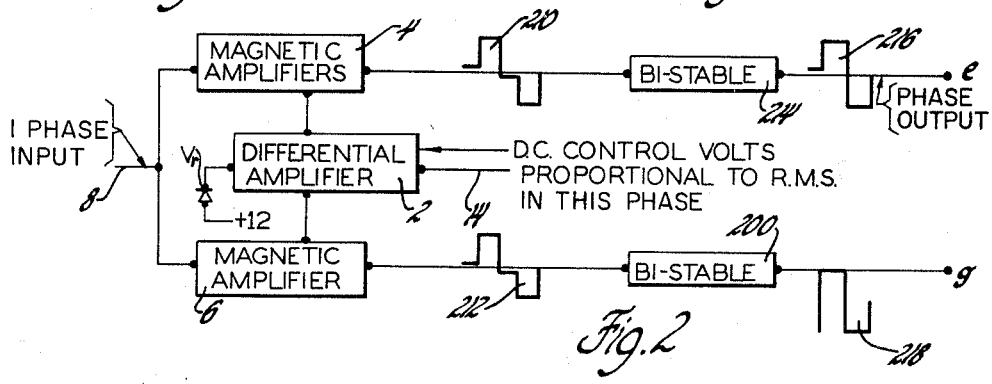
FIG. 2 is a block diagram illustrating the essential elements of the control system as applied to a single phase line of a multi-phase alternating current power supply system including magnetic amplifiers to provide the desired amplitude control without introducing phase shift.

Proceeding now to FIG. 2 there is shown therein a block diagram of the essential parts of the present invention. The present invention requires a differential amplifier, a pair of magnetic amplifiers and a pair of bi-stable units for controlling the pulse width of a single phase. This equipment could be commonly mounted within a casing or cabinet and electrically connected into each phase of a multi-phase power system. One differential amplifier can simultaneously control two magnetic amplifiers each of which is connected to a bi-stable unit to regulate each phase. In FIG. 2, therefore, there is shown a differential amplifier 2 which is commonly connected to a first magnetic amplifier 4 and also to a second magnetic amplifier 6. Both of these magnetic amplifiers are fed from a common alternating current power source, such as 8, which may, for example, be 400 cycle square wave voltage which is the frequency of the power being generated by the inverter system of one phase which has already been phase shifted 120° with respect to the other two phases of a three-phase system. The differential amplifier has connected thereto a suitable source of power indicated as $+12$ through a voltage regulating diode $V_r$ designed to act as a reference voltage. To the differential amplifier there is also applied through line 14 a control voltage from the output circuit which is proportional to the R.M.S. voltage in the output circuit of this one of the multiple phases. From this it will be seen that there are actually two inputs to this control system, one the 400 cycle signal from one phase from the main power supply as shown through 8 and the other the D.C. control voltage proportional to the R.M.S. volts in the output circuit through line 14. There is a combined output from the magnetic amplifiers and bi-stable units which is a square wave of variable width but whose phase does not change.

Figure 3:
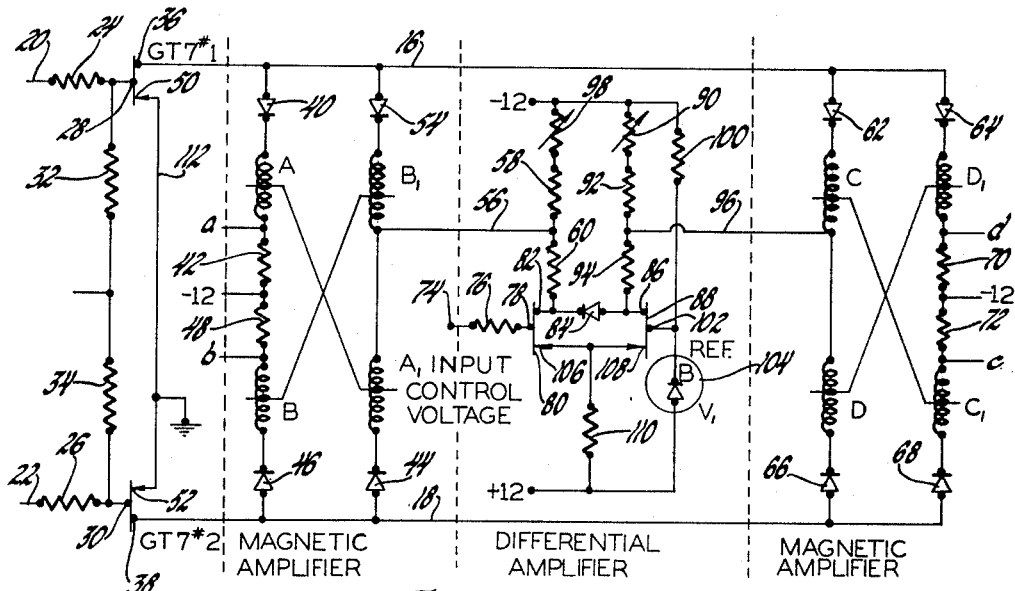
FIG. 3 is a circuit diagram of the specific circuitry utilizing two magnetic amplifiers controlled by the differential amplifier section.

Referring now particularly to FIG. 3 which shows the circuitry of the magnetic amplifiers and the differential amplifier, there is shown therein a pair of transistors GT7 #1 and GT7 #2 which alternately control the voltage on opposite lines 16 and 18. The 400 cycle signal such as appears on line 8 of FIG. 2 is applied to input lines 20 and 22 and through resistors 24 and 26 to the base electrodes 28 and 30 of transistors GT7 #1 and GT7 #2, respectively. Two resistances 32 and 34 are connected in series between the two base electrodes 28 and 30. The collector electrode 36 of transistor GT7 #1 is connected directly to line 16 and in a similar manner collector 38 of GT7 #2 is connected to line 18. Magnetic amplifier coil A is connected between rectifier 40 and load resistance 42 the opposite terminal of which is directly connected to a −12 volt power supply. The point intermediate winding A and the resistor 42 is idenfied as terminal $a$ and its connection to the remainder of the circuit will be later specifically described. Wound on the same core as winding A is a second winding $A_1$ which has one terminal connected through a rectifier 44 to line 18. The common winding of these two coils on a single core is indicated by the common zig-zag line drawn through the two. A second magnetic amplifier coil B is wound on a common core with winding $B_1$. One terminal of coil B is connected through rectifier 46 to line 18 and the other terminal connected to output terminal $b$ and through a load resistor 48 to the same −12 volt line. The emitter electrodes 50 and 52 of the two transistors GT7 #1 and GT7 #2 are commonly connected together and are grounded. One terminal of magnetic amplifier $B_1$ is connected through rectifier 54 to line 16 and the other terminal to the remaining terminal of winding $A_1$. This common connection is also connected through line 56 to a point intermediate resistors 58 and 60 which are connected in series.

The second magnetic amplifier is identical with the first and consists of windings C and $C_1$ wound on the same core as are also windings D and $D_1$. One terminal of each of windings C and $D_1$ are connected through rectifiers 62 and 64, respectively, to line 16 and in like manner one terminal of windings D and $C_1$ are connected through rectifiers 66 and 68 to line 18. Two resistances 70 and 72 are connected in series between the remaining terminals of windings $C_1$ and $D_1$ and their center tap is connected to the −12 volt power supply. Points intermediate winding $D_1$ and resistance 70 and winding $C_1$ and resistance 72 are indicated as connections $d$ and $c$, respectively, which will be later described.

The differential amplifier is connected to a source of power to provide a reference voltage and to this portion there is also applied an input voltage proportional to the R.M.S. value of the voltage in the phase which it is desired to regulate. This input control voltage is applied to terminal 74 which is connected through a limiting resistance 76 to the base electrode 78 of a transistor 80. The collector electrode 82 of this transistor is connected to the resistance 60 before mentioned and also through a rectifier 84 to the collector electrode 86 of a second transistor 88. A plurality of resistances 90, 92 and 94 are connected in series between the −12 volt power supply and the collector electrode 86, the first-named of these resistances being variable. A point intermediate resistances 92 and 94 is connected by conductive line 96 with one terminal of magnetic amplifier winding C. In like manner a variable resistance 98 is connected between the −12 volt power supply and one terminal of resistance 58 to form a volt divider with resistances 58 and 60. Biasing resistor 100 is connected between the −12 volt power supply and the base electrode 102 of the transistor 88. A voltage regulating diode 104 of the Zener type is connected between the base 102 and the +12 volt power supply line. The two emitter electrodes 106 and 108 of the transistors 80 and 88 are connected directly together and through a limiting resistor 110 to the positive power line +12. The biasing voltage and voltage regulator 104 are so designed and adjusted as to maintain on the base 102 of the transistor 88 a reference voltage such that when the R.M.S. value of the voltage in the phase output circuit is at the proper point the differential amplifier is balanced. If the R.M.S. voltage increases above or decreases below the reference value, then certain corrective effects take place which will be described.

Figure 5:
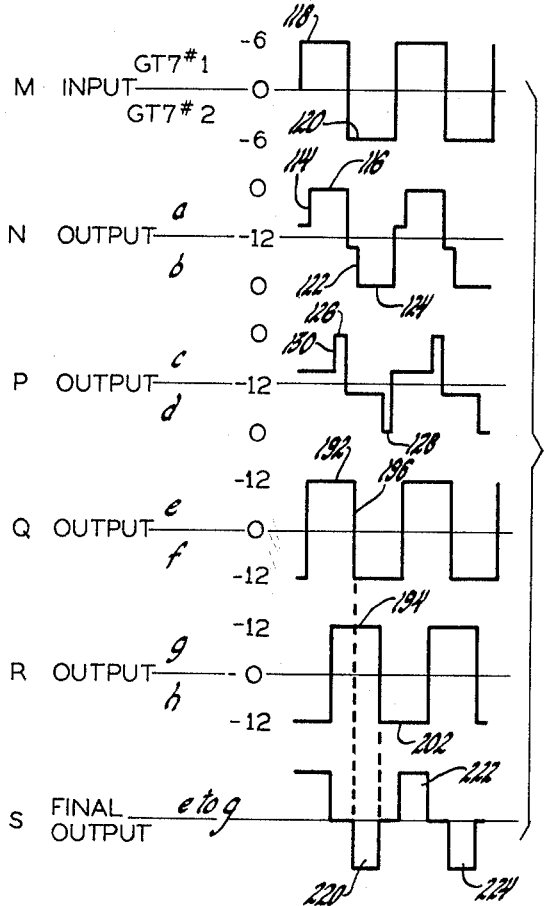

If it is assumed that the transistor GT7 #1 has a signal applied to its base so that it, at the instant under study, is conductive. This will cause current to flow from ground through conductive line 112, transistor GT7 #1, rectifier 40, coil A, resistor 42 to the −12 volt source. If at the moment the core upon which coil A is mounted is not saturated then coil A will drop practically all of the supply voltage, leaving a very small drop across the resistor 42. When the core saturates then the entire supply voltage will be dropped across the resistor 42 and none across the coil A. During the next half cycle transistor GT7 #1 will be switched off and GT7 #2 switched on. At this time the voltage will be applied across coil B. Again, at first most of the voltage will be dropped or absorbed by the coil B and very little across resistor 48 but as this core saturates the voltage will appear across the resistor 48 and practically none across the coil B. It is to be noted that the terminal points $a$ and $b$ are connected across these two resistors and referring now momentarily to the wave form appearing across these two terminals this form is found in FIG. 5, graph N. Graph M in FIG. 5 illustrates the input signal in the selected phase as applied to the two transistors GT7 #1 and GT7 #2. This is the 400 cycle square wave applied from line 20—22. It is to be noted, however, that across terminals $a$ and $b$ a narrowed pulse is obtained which is due to the length of time required to saturate the cores upon which coils A and B are wound. When transistor GT7 #1 is switched on there is a relatively short time during which most of the supply voltage is utilized in saturating the core and does not appear across the resistor 42. This is indicated by the notch 114 which appears in the front edge of the square pulse 116.

At the conclusion of the first pulse 118 applied from input line 20—22 transistor GT7 #1 is cut off and transistor GT7 #2 is turned on by the second pulse 120. When this transistor is turned on then a similar energizing circuit is completed from ground through transistor GT7 #2, rectifier 46, winding B, resistance 48 to the −12 volt supply. As in the previous case, in the initial period the main voltage drop will be across coil B to saturate the core and very little will appear across resistor 48. As soon as the core is saturated the main drop will occur across resistor 48. This produces the notch 122 in the second reverse pulse 124 as shown in chart N in FIG. 5. Thus between terminals $a$ and $b$ pulses will alternately appear as indicated at chart N in FIG. 5 in which the pulses will alternate between 0 and −12 and each will have a certain portion notched away from the leading edge depending upon the length of time required to saturate the core upon which the windings A and B are mounted.

Coil A is wound upon the same core as coil $A_1$ and coil B is wound on a common core with coil $B_1$ and in order to adjust the depth of the notch removed, saturation time can be controlled by varying the settings by current flow through the two coils $A_1$ and $B_1$. When transistor GT7 #1 is switched on a ground connection through the transistor is also applied to the upper terminal of coil $B_1$ and there is a voltage drop across coil $B_1$ depending upon the value of voltage that exists on line 56 or the lower terminal of $B_1$. Thus while coil A is actually saturating and providing the notch in the leading edge of pulse 116, simultaneously coil $B_1$ is setting the saturation of its core for the next pulse 124 which will be applied through transistor GT7 #2. The voltage on line 56 is dependent upon the value of the D.C. input voltage applied to terminal 74 from the phase output circuit. Further value of this voltage is compared to the reference voltage appearing at the Zener diode 104. A series circuit is provided from the −12 volt supply through resistors 98, 58 and 60 in series, thence through transistor 80 and resistance 110 to the +12 voltage supply. The amount of current flow through this series circuit will be dependent upon the bias or input applied to terminal 74 and this in turn will determine the voltage on line 56. As this voltage fluctuates up and down and is compared with the reference voltage on base 102 through diode 84 it will determine the amount of preset saturation in the cores upon which coils A and B are wound to so vary the depth of the notch in the leading edge of the pulses produced across terminals $a$ and $b$.

Simultaneously a parallel circuit is provided from the +12 volt supply through resistances 90, 92 and 94 in series, then through transistor 88 and resistance 110 to the +12 volt supply. In this other half of the circuit the base voltage is the predetermined reference voltage about which the circuit is designed to operate and the input voltage at terminal 74 is constantly being compared with the reference voltage appearing on the base 102 and it is, of course, either equal to, above or below the same. At the same time that the input voltage is adjusting the saturation of the cores upon which the coils A and B are mounted to thus adjust the depth of the notch being removed from the pulses 116 and 124, the same general type of action is being produced in the second magnetic amplifier C—D. In that case, when transistor GT7 #1 is conducting, which grounds line 16, coil $D_1$ will conduct and during the initial phase of conduction utilizes most of the voltage drop until the core is saturated. When the core becomes saturated the voltage drop will then appear across resistance 70 in series therewith for the remainder of the half cycle or pulse. As in the previous case, simultaneously therewith current will flow through coil C, which is wound on the same core as coil $C_1$ saturating or setting the saturation of that core for the next half cycle. Thus simultaneously with the operation of coils A and B to produce the notched pulses 116 and 124 across terminals $a$ and $b$ there is produced a series of pulses 126 and 128 across terminals $c$ and $d$ which are also notched. These pulses are shown in FIG. 5 on chart P and represent similar control over the edge of the pulse. The control exerted by the voltage from the differential amplifier in this case is applied through the line 96 and its effect on magnetic amplifier C—D is in the reverse order to the effect of the voltage on line 56 on the magnetic amplifier A—B. Thus if the voltage on terminal 74 should increase with respect to the reference voltage, transistor 80 will conduct more current and line 56 will move towards the +12 volt point. This would cause a larger voltage drop across coil $B_1$ during this half cycle of operation and preset the core to a greater value of flux. When transistor GT7 #2 would conduct, a larger size notch would be taken out of the wave form by the drop across coil B in the next half cycle. Therefore, as the voltage on line 56 goes positive the larger the notch out of the pulses 116 and the thinner the pulses becomes. Simultaneously, however, as the voltage on line 56 goes up towards the +12 volt, the voltage on line 96 goes down by an equal amount and, therefore, coil C re-sets or presets the saturation less during its half cycle and the notch 130 in the leading edge of that pulse would become less. Since the two move in opposite directions the width of the pulses will be adjusted as the voltage changes as will be explained.

From FIG. 5, therefore, it is observed that pulses of the shape shown in graph N are obtained from terminals $a$ and $b$ and pulses of the shape shown in graph P are obtained across terminals $c$ and $d$. The output across terminals $a$ and $b$ is applied to one bi-stable unit such as that shown in FIG. 4. In that case it is noted that the two terminals 132 and 134 are indicated as being connected to terminals $a$ and $b$, respectively. Terminal 132 is connected through a coupling condenser 136 to conductive line 138 and thence through Zener diode 142 to the base electrode 144 of transistor 146. In a similar manner terminal 134 is connected through coupling condenser 148 to conductive line 150 and thence through Zener diode 154 to the base electrode 156 of transistor 158. The two resistances 160 and 162 are connected in series across the lines 138 and 150 and their center tap grounded. Similarly two condensers 164 and 166 are connected in series across the lines 138 and 150 and their center tap grounded. Lastly, a pair of rectifiers 168 and 170 in inverse relation are connected between the lines 138 and 150 and their center point grounded. Two resistances 172 and 174 are connected in series between the two base electrodes 144 and 156 and a small potential of, for example, 3 volts positive is applied to the center tap between them for biasing purposes. The emitter electrodes 176 and 178 of the transistors 146 and 158, respectively, are directly grounded.

The collector electrode 180 of transistor 146 is connected through a limiting resistor 182 to the −12 volt power supply and similarly the collector electrode 184 of transistor 158 is connected through resistance 186 to the same power supply. A stabilizing resistor 188 is connected between collector 180 of transistor 146 and base 156 of transistor 158. A similar stabilizing resistor 190 is connected between base 144 and collector 184. A pair of output terminals $e$ and $f$ are connected, respectively, to the collector electrodes 180 and 184. With an input signal such as that indicated at $a$–$b$ in FIG. 5 applied to the bistable circuit terminals 132 and 134 shown in FIG. 4, the opposing transistors 146 and 158 will be alternately turned on and off at timed intervals depending upon the size and shape of the pulse applied. The output developed by such a signal across terminals $e$ and $f$ is, therefore, shown on chart Q in FIG. 5. This is a square wave of regular configuration such as would be expected from a bi-stable circuit and it is switched from −12 to ground on either side. Thus as the pulse at $a$ turns on transistor 146, a square step pulse 192 will appear at $e$ and it is to be noted that the leading edges of $a$ and $e$ are in vertical alignment indicating that they occur at the same instant of time. Transistor 146 remains in a conducting state until the transistor 158 is turned on at which time transistor 146 is switched off. This instant on chart Q is shown by vertical line 196 and it is in alignment with the leading edge of pulse $b$. Thus the width of the pulse 192 is determined by the difference in time between leading edges 114 and 122 and will be phase shifted along the time axis depending upon the depth of the niche taken out for correction which in turn is proportional to the D.C. signal fed back from the output.

While only one bi-stable unit has been shown in detail, a second bi-stable unit 200 is utilized in the control system as shown in FIG. 2 across which the output of terminals $c$–$d$ is applied and in a similar manner the pulses 194 are developed in that bi-stable unit. It is to be noted that pulses 194 developed by the second bistable unit 200 are triggered by pulses $c$ and, therefore, in FIG. 5 the leading edge of pulse 194 is in vertical alignment with leading edge 130 of pulse $c$. In like manner, the leading edge of the next pulse 202 is triggered by pulse 128 of the $d$ train and, therefore, is in vertical alignment therewith. The chart R illustrates the output of the bi-stable 200 which is likewise shifted along the time axis depending upon the saturation of the C and D cores in opposite phase to the A and B cores. Without any attempt at comparing in time phase the outputs of magnetic amplifiers 4 and 6 the square waves 210 and 212 merely show that a stepped wave is produced with a niche out of the same which wave is applied to a following bi-stable unit. In the case of magnetic amplifier 4 this pulse train 210 is applied to bi-stable unit 214 and in the case of magnetic amplifier 6 pulse train 212 is applied to bi-stable unit 200. The output of each bi-stable unit is a phase displaced square wave 216 and 218 as illustrated whose horizontal phase relation depends upon corrective needs.

Figure 4:
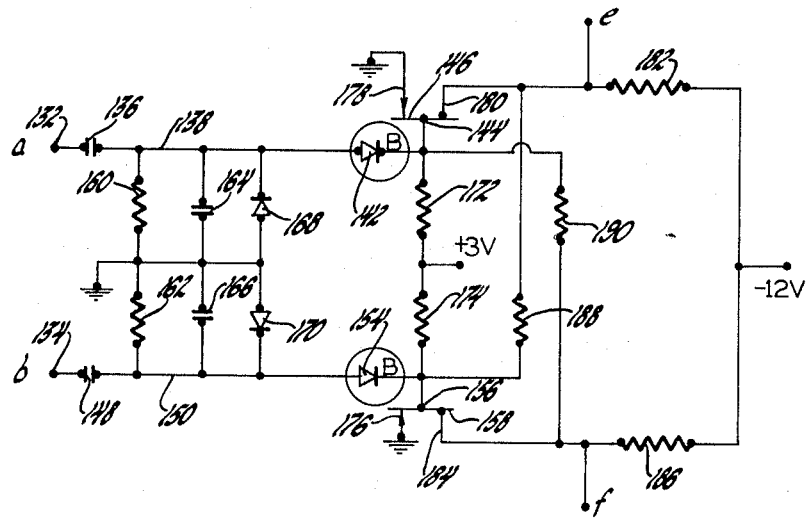
FIG. 4 is a circuit diagram of one of the bi-stable circuits which is utilized; and, FIG. 5 is a chart of the wave forms which appear at different indicated locations in the circuit.

As shown in FIG. 4 each bi-stable unit such as 214 of FIG. 2 has two output terminals shown as $e$ and $f$. Unit 200 of FIG. 2 would likewise have a pair of output terminals across which a similar square output wave would be developed when controlled by the pulse train $c$–$d$.

Those two terminals may be designated g and h and chart R shows the pulse train developed across these two terminals. By taking one terminal of each group that is, for example, e from bistable switching unit 214 and g from bistable switching unit 200 a final step wave is obtained whose width changes to change the R.M.S. value with changes in the output voltage of the phase but whose phase is exactly the same as that of the original wave. This is shown in chart S, FIG. 5, where pulses 220, 222 and 224 are shown. The leading edge of pulse 220 is determined by the output at e as shown by the dash line and the trailing edge by output at g similarly shown. Therefore, the pulse appearing across e–f in FIG. 4 or final output for any one phase which may be connected into a three-phase delta connection is that illustrated in chart S, FIG. 5, and this is regulated to maintain constant value by the disclosed control circuit.

In any one phase output then the pulses would vary only in width to change the R.M.S. value in that phase and even though combined in a three-phase system no phase shifts would be introduced in the delta connection to cause undesirable circulating currents.

What is claimed is:

1. In an alternating current system in which it is desired to maintain each separate phase voltage approximately the same each phase including two electrically conductive lines, a stabilizing control circuit comprising a feedback circuit for one phase connected to the output in which a D.C. voltage is developed that is proportional to the voltage in that phase, a differential amplifier connected to the feedback circuit, a source of electrical power and a voltage reference diode connected to said differential amplifier so that the voltage on the feedback circuit is constantly compared with a reference voltage to provide a pair of differential signal voltages moving in opposite directions as the feedback voltage changes, a plurality of magnetic amplifying means one connected in each electrically conductive line, said differential amplifying means being connected to each magnetic amplifying means to control the signal voltages passing therethrough to cause the pulse through one magnetic amplifying means to be initiated earlier in the cycle and through the other magnetic amplifying means later in the cycle, a bi-stable switching means connected to the output of each magnetic amplifying means and developing pairs of square wave stepped signals that move along the time base in opposite directions as the signals formed by the associated differential amplifier are applied, the combined output from adjacent bi-stable switching means connected to the output and forming output voltage pulses whose width or R.M.S. value changes but whose phase remains constant as the feedback voltage amplitude varies.

2. In an alternating current system in which it is desired to maintain each separate phase voltage approximately the same, a stabilizing control circuit comprising a feedback circuit for the phase connected to the output in which a D.C. voltage is developed that is proportional to the voltage in that phase, a differential amplifier connected to the feedback circuit, said differential amplifier including a plurality of parallel voltage dividers, a transistor amplifier in series with each voltage divider and a reference diode connected to one of the transistor amplifiers, a source of electrical power connected to the voltage dividers and transistor amplifiers and reference diode to establish reference voltages, said feedback circuit being connected directly to the transistor amplifier not connected to the reference diode and a plurality of take off points on the voltage dividers whose voltages vary in opposite sense as the voltages of the feedback circuit exceeds or decreases below that of the reference diode.

3. In an alternating current system in which it is desired to maintain each separate phase voltage approximately the same, a stabilizing control circuit comprising a feedback circuit for the phase connected to the output in which a D.C. voltage is developed that is proportional to the voltage in that phase, a differential amplifier connected to the feedback circuit, said differential amplifier including a plurality of parallel voltage dividers, a transistor amplifier in series with each voltage divider, a reference diode connected to one of the transistor amplifiers, a source of electrical power connected to the voltage dividers and transistor amplifier and reference diode to establish reference voltages, said feedback circuit being connected directly to the transistor amplifier not connected to the reference diode, a plurality of take off points on the voltage dividers whose voltages vary in opposite sense as the voltage of the feedback exceeds or decreases below that of the reference diode, a plurality of magnetic amplifier means, each magnetic amplifier means including a plurality of coil and core means, conductive means for connecting one take off point on the voltage dividers to a portion of the coil means of one magnetic amplifier to preset the saturation of each core from the application of an input signal, a second conductive means connecting a second take off point on the voltage dividers to a portion of the coil means for a second magnetic amplifier means to preset the saturation of each one in the opposite sense, means connected to the output of both magnetic amplifier means in which there is produced a resultant output of both magnetic amplifier means as a change in pulse width.

4. In an alternating current system in which it is desired to maintain each separate phase voltage approximately the same value, a stabilizing control circuit comprising a feedback circuit for the phase connected to the output in which a D.C. voltage is developed that is proportional to the voltage in that phase, a differential amplifier connected to the feedback circuit, said differential amplifier including a plurality of parallel voltage dividers, a transistor amplifier in series with each voltage divider and a reference diode connected to one of the transistor amplifiers, a source of electrical power connected to the voltage dividers and transistor amplifiers and reference diode to establish reference voltages, said feedback circuit being connected directly to the transistor amplifier not connected to the reference diode, a plurality of take off points on the voltage dividers whose voltages vary in opposite sense as the voltage of the feedback exceeds or decreases below that of the reference diode, a plurality of magnetic amplifier means each including a plurality of coil and core means, conductive means for connecting one take off point on the voltage dividers to a portion of the coil means of one magnetic amplifier to preset the saturation of each core prior to application of an input signal, a second conductive means connecting a second take off point on the voltage dividers to a portion of the coil means for a second magnetic amplifier means to preset the saturation of each one in the opposite sense, a bi-stable switching means connected to the output of each magnetic amplifier means to produce square wave output signals in each and conductive means connected across the bi-stable switching means to provide a single phase output voltage that is controlled in R.M.S. value but whose phase is not changed.

5. In an alternating current system in which it is desired to maintain each separate phase voltage approximately the same value, a stabilizing feedback circuit for one phase connected to the output of the phase in which a D.C. voltage is developed that is proportional to the output voltage, a differential amplifier connected to the feedback circuit, a source of electrical power and a voltage reference diode connected to said differential amplifier to constantly compare the voltage of the feedback circuit with a reference voltage to provide a pair of differential signal voltages moving in opposite directions as the feedback voltage fluctuates, a plurality of magnetic amplifier means, single input means for a given phase connected to both magnetic amplifier means, said differential amplifier means connected independently to each magnetic amplifier means to independently control the signal voltages passing therethrough to adjust the instant of initiation of the passage of waves applied, bi-stable switching means connected to each of the magnetic amplifier means, each of which develops a square wave output that may move along a time base depending upon the instant of initiation of the associated magnetic amplifier means and a common output circuit for the complete phase connected across the two bi-stable switching means.

References Cited by the Examiner

UNITED STATES PATENTS

| | | | |
|---|---|---|---|
| 2,892,970 | 6/59 | Sims | 323—89 |
| 2,955,247 | 10/60 | Moyer et al. | 321—25 |
| 3,071,720 | 1/63 | Geissing | 321—40 |

LLOYD McCOLLUM, *Primary Examiner.*

MILTON O. HIRSHFIELD, GEORGE J. BUDOCK, *Examiners.*